United States Patent Office 3,819,702
Patented June 25, 1974

---

3,819,702
BUTYRAMIDINE
Victor Lafon, Paris, France, assignor to Societe anonyme dite: Orsymonde, Paris, France
No Drawing. Filed June 18, 1971, Ser. No. 154,679
Claims priority, application France, June 29, 1970, 7024016
Int. Cl. C07c 123/00
U.S. Cl. 260—564 G   5 Claims

ABSTRACT OF THE DISCLOSURE

New derivatives and analogous of butyramidine having the general formula:

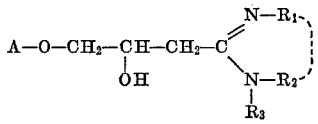

in which A represents α-naphthyl or β-naphthyl, $R_3$ represents a hydrogen atom or a lower alkyl group having 1 to 3 carbon atoms, $R_2$ represents a hydrogen atom, a hydroxyl group or a lower alkyl group having 1 to 3 carbon atoms, and $R_1$ represents a hydrogen atom, $R_1$ and $R_2$ considered together being capable of forming with the two nitrogen atoms and the carbon atom of the amidine function of 2-imidazolinyl or 1,4,5,6-tetrahydro-2-pyrimidinyl radical when $R_3$ is a hydrogen atom.

The compounds of Formula I and the non-toxic acid addition salts thereof are active β-blocking agents and are used in the treatment of cardiac troubles.

---

The present invention relates to new derivatives and analogues of butyramidine as well as their acid addition salts. These derivatives and analogues correspond to the general formula:

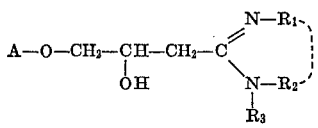

in which A represents α-naphthyl or β-naphthyl, $R_3$ represents a hydrogen atom or a lower alkyl group having 1 to 3 carbon atoms, $R_2$ represents a hydrogen atom, a hydroxyl group or a lower alkyl group having 1 to 3 carbon atoms, and $R_1$ represents a hydrogen atom, $R_1$ and $R_2$ considered together being capable of forming with the two nitrogen atoms and the carbon atom of the amidine function a 2-imidazolinyl or 1,4,5,6-tetrahydro-2-pyrimidinyl radical when $R_3$ is a hydrogen atom.

By "derivatives" of butyramidine is meant the α- and β-naphthyl-4-oxy-3-hydroxy butyramidines, mono- or di-substituted on one of the nitrogen atoms of the amidine group; by "analogue" is meant the cyclic amidines, the lateral chain becoming in this case a 3-α-naphthoxy 2-hydroxy propyl chain.

The invention equally concerns pharmaceutical compositions including, in association with a physiologically-acceptable vehicle, at least one compound of Formula I or one of the non-toxic acid addition salts as an active β-blocking ingredient. The pharmaceutical compositions according to the invention, are used particularly in the treatment of cardiac troubles.

The invention equally relates to a process for the preparation of the compounds of formula I from α- or β-naphthol. According to this process, after having condensed the naphthol on epichlorhydrin in the presence of caustic soda and treated the 3-naphthyloxy-1,2-epoxy propane with hydrochloric acid gas:

(a) the 1-chloro-3-naphthyloxy-2-propanol is reacted with potassium cyanide in an anhydrous solvent at the reflux temperature of the said solvent;
(b) the naphthyloxybutyronitrile obtained is condensed with ethanol in an anhydrous medium, and
(c) the imino-ethyl-ether thus obtained is condensed with an amine of the formula:

$$HNR_3R_2 \qquad \text{II}$$

in which $R_2$ and $R_3$ are identical or different and each represents a hydrogen atom or a lower alkyl group having 1 to 3 carbon atoms, the compound of formula I in which $R_1=R_2=R_3=H$ being capable of reacting with hydroxylamine, ethylenediamine and propylene-diamine to give respectively 4-naphthyloxy 3-hydroxy butyramidoxime, 2-(3-naphthyloxy-2-hydroxy propyl)-imidazoline, and 2-(3-naphthyloxy-2-hydroxy propyl)-1,4,5,6-tetrahydro pyrimidine, and wherein the compounds of formula I are capable of being transformed into acid addition salts.

The acid addition salts which are suitable according to the invention are those obtained from pharmaceutically acceptable acids, for example, mineral acids, such as hydrochloric, hydrobromic, hydroiodic, sulphuric and phosphoric acids, and from organic acids, such as oxalic, fumaric, maleic, citric, ascorbic, cyclohexylsulphamic and benzoic acids.

According to one feature of the invention butyramidine hydrochlorides of formula I are obtained at the end of the process by effecting the above described condensation (b) under a current of hydrochloric acid gas and then treating the imino-ethyl-ether hydrochloride by the amine $HNR_2R_3$ according to the above reaction (c).

Other advantages and essential features of the invention will be better understood from the description of the following non-limitative Examples:

EXAMPLE 1

4-α-naphthyloxy-3-hydroxy-butyramidine hydrochloride

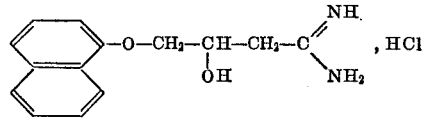

9.3 g. (0.1 mol) of epichlorhydrin in 20 ml. of ethanol were added to a solution of 15 g. (0.1 mol) of α-naphthol and 4 g. (0.1 mol) of caustic soda in 50 ml. of water. The mixture was heated for 5 mins. at boiling point. After evaporation of the ethanol and cooling, 3-α-naphthyloxy-1,2-epoxy propane formed in ethyl ether was extracted. This ethereal solution, was rinsed in water and then dried in anhydrous sodium sulphate and saturated by a current of dry hydrochloric acid gas. After 48 hours, it was rinsed with water, then with a diluted solution of sodium carbonate and finally with water again. After drying in anhydrous sodium sulphate and evaporation of the ethyl ether, 23.1 g. (yield 97%) of crude 3-α-naphthyloxy-1-chloro-2-propanol were obtained.

A solution of 7.1 g. (0.11 mol) of potassium cyanide in 30 ml. of water was added to this product (0.097 mol) dissolved in 120 ml. of ethanol. The mixture was heated at boiling point under reflux of the solvent for 1 hour. After evaporation under vacuum of the solvent and cooling, ethyl ether was added. The ethereal solution was rinsed in water, dried in anhydrous sodium sulphate and then evaporated. 20 g. (yield 90%) of crude 4-α-naphthyloxy-3-hydroxy butyronitrile were obtained.

The solution of this product (0.088 mol) in 20 ml. of ethanol and 150 ml. of ethyl ether was saturated in the cold state by a current of hydrochloric acid gas. The mixture was then placed in a refrigerator for one night. 150 ml. of ethyl ether were added and 20 g. (yield 74%) crude 4-α-naphthyloxy-3-hydroxy-butyroimino-ethyl ether hydrochloride were obtained.

The solution of this product (0.065 mol) in 200 ml. of ethanol was saturated by a current of dry ammonia. After one night in a refrigerator, 200 ml. of ether was added and filtered off. The crude 4-α-naphthyloxy - 3 - hydroxy butyramidine hydrochloride, thus isolated, was purified by crystallisation in methanol.

The product was obtained in a total yield of 57% in the form of a white micro-crystalline powder (instantaneous melting point: 203° C.), soluble in water, slightly soluble in methanol and ethanol and insoluble in ethyl ether and acetone.

The following shows the reactions which occurs in the synthesis according to Example 1.

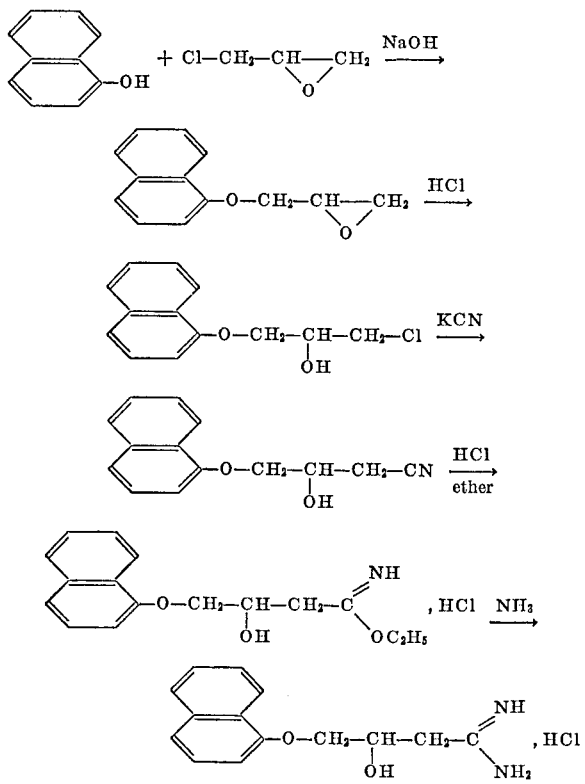

EXAMPLE 2

4-α-naphthyloxy-3-hydroxy-butyramidoxime hydrochloride

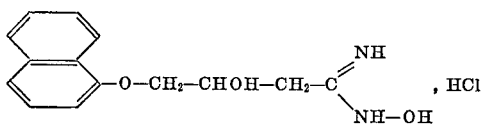

56.2 g. (0.2 mol) of 4-α-naphthyloxy-3-hydroxybutyramidine hydrochloride prepared according to Example 1 were added to a solution of hydroxylamine in 300 ml. of methanol prepared from 21 g. (0.3 mol) of hydroxylamine hydrochloride and sodium methylate. After 1 hour of agitation, the mixture was left at the ambient temperature for 24 hours.

The evaporation under vacuum of the solvent left a residue which was recovered in water and ethyl ether. The ethereal solution was dried in anhydrous sodium sulphate, then evaporated resulting in 4-α-naphthyloxy-3-hydroxyl butyramidoxime base. By adding hydrochloric ethanol, the hydrochloride was obtained which was isolated after precipitation in ethyl ether. It was purified by crystallisation in an ethyl ether/methanol mixture.

This product was obtained in a yield of 74% in the form of a white crystalline powder (instantaneous melting point: 188° C.), soluble in water, methanol, ethanol and insoluble in ethyl ether.

EXAMPLE 3

2-(3α-naphthyloxy-2-hydroxy-propyl)-imidazoline hydrochloride

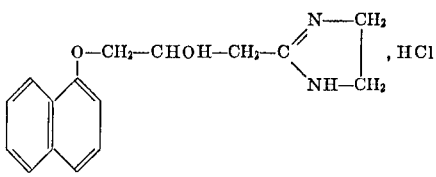

5.6 g. (0.02 mol) of 4-α-naphthyloxy-3-hydroxy-butyramidine hydrochloride prepared according to Example 1, 30 ml. of ethanol and 2 ml. of ethylenediamine were introduced into a balloon flask. The mixture was heated to the boiling point of the solvent and reflux was maintained for 4 hours.

The ethanol was evaporated under vacuum and the residue treated with ethyl ether.

The crude hydrochloride thus isolated, was purified by crystallisation in methanol.

The product was obtained in a yield of 79% in the form of fine white crystals (instantaneous melting point 220° to 222° C.), soluble in water, slightly soluble in methanol and ethanol and insoluble in ether and acetone.

By proceeding according to Example 3, but replacing the ethylene diamine by propylenediamine, 2-(3-α-naphthyloxy-2-hydroxy-propyl)-1,4,5,6 - tetrahydro-pyrimidine hydrochloride was obtained.

EXAMPLE 4

4-α-naphthyloxy-3-hydroxy-N,N-dimethyl-butyramidine hydrochloride

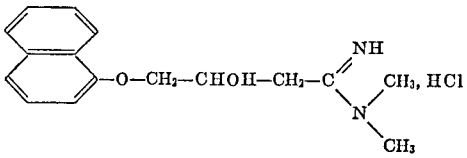

6.2 g. (0.02 mol) of 4-α-naphthyloxy-3-hydroxy-butyroimino-ethyl ether hydrochloride, prepared according to Example 1, 20 ml. ethanol and 13.2 ml. (0.09 mol) of dimethylamine in alcoholic solution at 330 g./l. was added to a balloon flask.

The mixture was brought to boiling point and then maintained for 3 hours under reflux.

The alcohol was then removed under vacuum. The residue was recovered in water. The aqueous solution was rinsed in ethyl ether and filtered through carbon, and then evaporated under vacuum.

The crude 4 - α-naphthyloxy-3-hydroxy-N,N-dimethyl-butyramidine hydrochloride thus isolated was purified by crystallisation in a methanol/ethyl acetate mixture.

The product was obtained in a yield of 73% in the form of white flakes (instantaneous melting point: 152° C.), soluble in water, methanol and ethanol and insoluble in ether, benzene and ethyl acetate.

EXAMPLE 5 (Comparative)

4-α-naphthyloxy-3-hydroxy-butyrohydroxamic acid

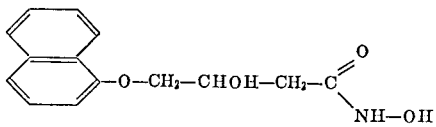

20 g. (0.065 mol) of 4-α-naphthyloxy-3-hydroxybutyroimino-ethyl ether hydrochloride, prepared according to Example 1, and 200 ml. of water were introduced into a balloon flask and were brought to boiling point. After cooling, the aqueous solution was extracted with ethyl ether.

The ethereal phase was rinsed with an aqueous solution of sodium bicarbonate, then water and dried on anhydrous sodium sulphate. After evaporation under vacuum of the ethyl ether, crude 4 - α-naphthyloxy-3-hydroxy-ethyl butyrate was obtained.

7.7 g. (0.11 mol) of hydroxylamine hydrochloride and 6 g. (0.11 mol) of sodium methylate were added to this product which was solubilised in 250 ml. of methanol. It was left for 24 hours at the ambient temperature. The methanol was then evaporated under vacuum and the residue recovered in water. After acidification, the 4-α-naphthyloxy-3-hydroxybutyrohydroxamic acid was isolated by filtration and rinsed in ethyl ether. It was purified by crystallisation in ethanol.

The product was obtained in a yield of 82% in the form of creamy white flakes (instantaneous melting point: 171° C.), soluble in methanol, slightly soluble in cold ethanol and insoluble in ether and water (less than 1 g./l.). It was prepared to show the importance of the C=NH bond with regard to cardiovascular activity.

The products of Examples 1 to 5 have been subjected to pharmacological experiments.

EXAMPLE 6

(a) 4-β-naphthyloxy-3-hydroxy butyronitrile

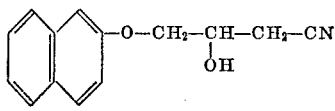

A solution of 28.8 g. (0.2 mol) of β-naphthol, 8 g. (0.2 mol) of caustic soda in pastilles and 18.6 g. (0.2 mol) of epichlorhydrin in 200 ml. of water were heated for 10 mins. at boiling point, left to cool and then extracted with 200 ml. ether, washed in water and dried on sodium sulphate and finally filtered.

The filtrate was saturated with hydrochloric acid gas up to absorption of 10 g. (0.27 mol), left for 48 hours at 20° C., washed with water, then with dilute sodium bicarbonate, dried and finally the ether was evaporated off under vacuum. 200 ml. of ethanol and a solution of 13 g. (0.2 mol) of potassium cyanide in 30 ml. of water were added to the residue.

The treated residue was heated for 2 hours at boiling point, dried and washed in water and then recrystallised to produce 4-β-naphthoxy-3-hydroxy butyronitrile with a yield of 72% and having a melting point of 142° C.

(b) 4-β-naphthyloxy-3-hydroxy-butyramidine hydrochloride

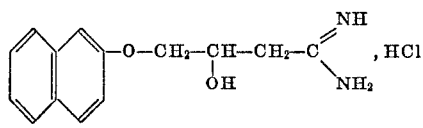

A solution of 32.5 g. (0.143 mol) of 4-β-naphthoxy-3-hydroxy-butyronitrile in 40 ml. ethanol and 300 ml. of chloroform was saturated with hydrochloric acid gas. The solvents were evaporated off under vacuum, taken up in acetone and dried.

The precipitate in solution in 150 ml. of ethanol was saturated with ammonia, stirred for 2 hours in the cold state and dried.

4 - β-naphthoxy-3-hydroxy-butyramidine hydrochloride was obtained with a yield of 95% in the form of small white needles which were soluble in water, and had a melting point of 192° C.

EXAMPLE 7

4-β-naphthyloxy-3-hydroxy-butyramidoxime hydrochloride

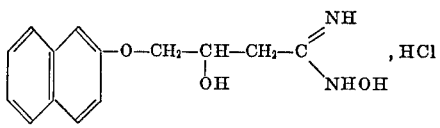

A solution of hydroxylamine was prepared by adding 4.1 g. (0.075 mol) of sodium methylate to 5.25 g. (0.075 mol) of hydroxylamine hydrochloride in solution in 250 ml. methanol, and then stirred for a half-hour and the NaCl then filtered off.

14 g. (0.05 mol) of 4-β-naphthoxy-3-hydroxy-butyramidine was added to this solution which was then left for one night. The methanol was then evaporated off under vacuum, 100 ml. of water was added and the solution was then evaporated, washed in water, dried and recrystallised in ethyl acetate.

The hydrochloride was obtained by adding hydrochloric ethanol base to the ethereal suspension up to a pH 1. It was then evaporated and recrystallised in an ethanol-ether mixture.

4 - β-naphthoxy-3-hydroxy-butyramidoxime hydrochloride was obtained with a total yield of 62% in the form of a white powder soluble in water, ethanol, methanol and insoluble in ether and benzene.

The product of Example 1 has a DL–50 by intravenous means in mice of 27.5 mg./kg. The ocular, intravenous and intra-muscular tolerance was studied in rabbits, dogs and rats. The results relating to such tolerances are listed in Table I.

The product of Example 1 exerted a β-blocking effect on an isolated guinea pig auricle with a dose of 1.4 mcg./ml., that is to say with the same dose as the propanol in our experiments. It had a coronary dilatating effect on an isolated rabbit heart. The product by I.V. and I.M. injection produced fleeting hypotension in an anaesthetized rabbit. By I.M. injection in rats, it exerted variable effects according to the animals.

The preparation perfused intravenously in dogs with a dose of 2.75 mg./kg. caused a fall in the intraventricular pressure, a drop in the cardiac frequency with extension of the ejection time, and an increase in heart beat. These effects are favourable to an anti-anginous action.

The toxicity of the product of Example 2 was studied in mice. By I.V. injection, the dose of DL–50 was 180 mg./kg. and orally, was 1000 mg./kg.

In anaesthetised dogs, the product of Example 2 exerted an anti-anginous activity by I.D. means in doses of 36 and 90 mg./kg. It is less active by I.M. injection with a dose of 60 mg./kg.

In normally tensioned or hypotensioned rats, the product administered intramuscularly and orally did not exert any hypotensive effect.

An oral dose of 310 mg./kg. had analgesic properties of the morphine type.

The product administered intravenously to rats caused hypotension of long duration but was non-gangioplegic.

With a DL–50 of 59 mg./kg. of the product of Example 3 administered to mice intravenously, the following symptoms were observed: convulsions then sedation, polypnea and death by respiratory arrest.

The animals which had received 30 mg./kg. I.M. of the product had practically no symptoms, except torsion of the body.

To show the cardiovascular properties, the β-blocking properties were studied on an isolated guinea pig auricle. With a dose of 0.1 μg./ml. the product exerted no action on the isolated auricle, it twice reduced (−66%, −29%) for 3 to 30 mins. and once increased (+100%) for more than 15 mins., the positive inotropic action of the isoprenaline.

With a dose of 1 μg./ml. it did not exert any action on the isolated auricle, it twice reduced (—100%, —18%) from 3 to more than 50 mins. and once increased (+111%) the positive inotropic action of the isoprenaline.

The product of Example 4 had a DL–50 of 25 mg./kg. when administered intravenously in mice. The following symptoms were observed: polypnea, hematuria. Death, when it arrived, was immediate. The mice which had received a dose of 12.5 μg./kg. by I.M. injection showed torsion of the body, the mortality being increasable by electric shock. In order to show the β-blocking properties, an isolated guinea pig auricle was used. The β-blocking action only appeared at 10 mcg./ml. and was fleeting (<5 min.).

For the coronary dilatory properties, experiments were carried out on anaesthetised dogs; the product was administered intravenously with a dose of 2.5 mg./kg. in two dogs. The following occurrences were observed:

a fall in blood pressure (—22%);
a reduction in the left intraventricular pressure (—42%);
an extension of the time of ejection (23%) accompanied by a moderate bradycardia.

The output of the coronary sinus, the coronary arterial and venous PO₂ were not modified.

Regarding the therapeutic use, it is preferable to specify that the pharmaceutical composition which is administered includes at the most 90% b.w. of a compound of Formula I or one of its non-toxic acid addition salts as the active ingredient. The active ingredient is associated with a physiologically-acceptable vehicle known in itself to give a medicine which can be administered by injection, oral or rectal means and by perfusion.

Each injection dose should comprise 5 to 25 mg. of the active ingredient in solution in 2 ml. of isotonic solution of 9 g./l. Capsules, tablets or cachets may be used for oral doses, each preferably containing 125 to 150 mg. of the active ingredient.

The products of Examples 1 to 4 have been administered successfully to humans in the treatment of arythmia in the form of injectable phials containing 5 mg. in 2 ml. of NaCl solution of 9 g./l.

The products of Examples 2 and 3 have given good results in cardiac troubles, with arythmia. They have been administered in the form of measured capsules, tablets and cachets of 125 mg. and in the form of injectable phials of 25 mg. in isotonic sodium chloride solution.

The derivatives of Examples 6(b) and 7 are active for the treatment of arythmia in humans, with the dose of 150 mg. per dose (capsules or tablets) three to four times a day.

TABLE I

| Number of animals | Composition used | Dose | Administration | Tolerance |
|---|---|---|---|---|
| 2 rabbits | Solution of 10 g./l. in physiological serum. | 3 times two drops or 3 mg. | 2 drops every 30 mins. in the eye, or 1 mg. every 30 mins. | Average—Irritation from the 4th drop. |
| Do | do | 1 ml. per rabbit ≈ 4 mg./kg | I.V. | Good. |
| 2 dogs | do | 1 ml./kg ≈ 10 mg./kg | I.M. | Mediocre—Salivation, polypnea, diarrhea, sedation. |
| 5 rats | Phial of 5 mg. of active principle in 5 ml. of injectable solute. | 1 ml./rat or 5 mg./kg | I.M. | Good. |
| 2 dogs | 1st dog: Phial of 5 mg. per 5 ml. of solute. 2d dog: Solution of 63 g./l. in physiological serum. | 5 mg./dog 3 mg./kg | I.V. | Do. |

The observed occurrences are in the sense of a β-blocking type anti-anginous action but are not dilatory.

The toxicity of the product of Example 5 was tested on mice by means of oral doses of up to 2 g./kg. No effect was observed. In other respects, the animals treated did not show any symptoms.

Observation of the mice which had received 2 g./kg. by gastric means showed an increase in lacrymation and a hypothermy of —2.3° C.

Regarding cardiovascular activities, experiments were carried out on isolated rabbit hearts. On two rabbit hearts perfused with Van Dick Hastings liquid without BaCl₂ the product of Example 5, with a dose of 10 mcg./ml. (1 experiment) increased the coronary output by 20%, exerted a negative inotropic effect of —28%, did not alter the rhythm, and with a dose of 100 mcg./ml. (two experiments) it reduced the coronary output by 55%, exerted a negative inotropic effect of 24 to 50% and did not alter the rhythm of the ventricular beats.

The product administered to four rats in an oral dose of 1 g./kg. did not exert any effect on the blood pressure during the 6 hours of observation.

The product in doses of 0.1 to 100 mcg./ml. did not exert any effect on an isolated guinea pig auricle. With the same doses, neither the inotropic action nor the chronotropic action of isoprenaline were modified.

The product of Example 5 is devoid of cardiovascular action; its lack of action shows the importance of the C=NH or C=N—R bond of the amidine group. This bond must be present if activity in the products of the present series is desired.

I claim:
1. A compound of the formula:

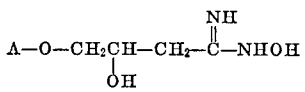

wherein A is α-naphthyl or β-naphthyl, or a salt thereof with a pharmaceutically acceptable acid.

2. The compound of claim 1 which is 4-(α-naphthyloxy)-3-hydroxybutyramidoxime hydrochloride.

3. The compound of claim 1 which is 4-(β-naphthyloxy)-3-hydroxybutyramidoxime hydrochloride.

4. 4-(α - naphthyloxy)-3-hydroxybutyramidoxime or a salt thereof with a pharmaceutically acceptable acid.

5. 4-(β - naphthyloxy)-3-hydroxybutyramidoxime or a salt thereof with a pharmaceutically acceptable acid.

References Cited

Migrdichian, "Organic Synthesis," vol. II, pp. 1282–84 (1960).
Morrison et al.: "Organic Chemistry," p. 23 (1962).
Smith, "Open Chain Nitrogen Compounds," vol. I, pp. 177, 183 and 220 (1965).

LEON ZITVER, Primary Examiner
G. A. SCHWARTZ, Assistant Examiner

US. Cl. X.R.

260—251 R, 309.6, 343.7, 348.6, 453 R, 465 F, 500.5 H, 501.12, 501.14, 564 R, 613 D; 424—251, 273, 316, 326